US008768861B2

(12) United States Patent
Donato et al.

(10) Patent No.: US 8,768,861 B2
(45) Date of Patent: Jul. 1, 2014

(54) RESEARCH MISSION IDENTIFICATION

(75) Inventors: Debora Donato, San Francisco, CA (US); Francesco Bonchi, Barcelona (ES); Liang-Yu Chi, San Francisco, CA (US); Yoelle Maarek, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 677 days.

(21) Appl. No.: 12/790,895

(22) Filed: May 31, 2010

(65) Prior Publication Data

US 2011/0295776 A1  Dec. 1, 2011

(51) Int. Cl.
*G06N 7/00* (2006.01)
*G06F 17/30* (2006.01)

(52) U.S. Cl.
CPC .......... *G06N 7/005* (2013.01); *G06F 17/30864* (2013.01); *G06F 17/30867* (2013.01)
USPC ............................................. 706/12; 707/708

(58) Field of Classification Search
CPC .............. G06N 7/005; G06F 17/30864; G06F 17/30867
USPC ............................................. 706/12; 707/708
See application file for complete search history.

(56) References Cited

U.S. PATENT DOCUMENTS

| | | |
|---|---|---|
| 2005/0080782 A1 | 4/2005 | Ratnaparkhi et al. |
| 2006/0143254 A1 | 6/2006 | Chen et al. |
| 2008/0183685 A1 | 7/2008 | He et al. |

FOREIGN PATENT DOCUMENTS

| | | | |
|---|---|---|---|
| JP | 2007-156932 A | 6/2007 | |
| WO | 2011/152971 A2 | 12/2011 | |
| WO | 2011/152971 A3 | 4/2012 | |

OTHER PUBLICATIONS

Erick Schonfeld ("Yahoo Search Pad Uses Search to Help Your Brain Take Notes." Feb. 4, 2009.*
Donato et al ("Do You Want to Take Notes? Identifying Research Missions in Yahoo! Search Pad." Apr. 26-30, 2010.*
Boldi et al ("The Query-flow Graph: Model and Application" Oct. 2008).*
Brenes et al ("Survey and evaluation of query intent detection methods" Feb. 2009).*
Lee et al ("Automatic Identification of User Goals in Web Search" 2005).*
Richardson, "Learning about the World through Long-Term Query Logs", Microsoft Research, ACM Transactions on the Web, vol. 2, No. 4, Article 21, Oct. 2008, 27 pages.
Baeza-Yates, "Graphs from Search Engine Queries", Yahoo! Research, Barcelona, Spain & Santiago, Chile, 2007, 8 pages.
Bharat, "Search Pad: Explicit Capture of Search Context to Support Web Search", <http://www9.org/w9cdrom/173/173.html>, Retrieved on May 24, 2010, 15 pages.
Broder, "A taxonomy of web search", vol. 36, Issue 2, IBM Research, 2002, 8 pages.

(Continued)

*Primary Examiner* — Lut Wong
(74) *Attorney, Agent, or Firm* — Pillsbury Winthrop Shaw Pittman LLP (57) ABSTRACT

A system and method is described herein that automatically determines if a user of a search engine is conducting a research mission and then provides one or more research tools, one or more specialized searches, one or more directed ads, and/or one or more marketplace events responsive to determining that the research mission is being conducted. The automatic provision of various events and/or tools responsive to determination of the research mission can advantageously improve the experience of the user conducting the research mission.

20 Claims, 6 Drawing Sheets

(56) References Cited

OTHER PUBLICATIONS

International Search Report and Written Opinion received for PCT Patent Application No. PCT/US2011/036065 mailed on Jan. 2, 2012, 9 pages.

He et al., "Detecting session boundaries from Web user logs", School of Computer and Mathematical Sciences, The Robert Gordon University, 2000, 10 pages.

He et al., "Combining evidence for automatic Web session identification", Information Processing and Management, vol. 38, Issue 5, Sep. 2002, pp. 727-742.

Gabrilovich et al., "Computing Semantic Relatedness using Wikipedia-based Explicit Semantic Analysis", International Joint Conference on Artificial Intelligence Proceedings of the 20th international joint conference on Artifical intelligence, 2007, pp. 1606-1611.

Jones et al., "Beyond the Session Timeout: Automatic Hierarchical Segmentation of Search Topics in Query Logs", CIKM '08, Oct. 26-30, 2008, 10 pages.

Maarek et al., "Automatically Organizing Bookmarks per Contents", Computer Networks and ISDN Systems, vol. 28, issues 7-11, p. 1321, IBM Haifa Research Laboratory, 1996, 18 pages.

Abrams et al., "Information Archiving with Bookmarks:Personal Web Space Construction and Organization", CHI 98, Apr. 18-23, 1998, pp. 41-48.

"Zotero", retrieved from <http://www.zotero.org>, Retrieved: May 8, 2012, 3 pages.

Luxenburger et al., "Matching Task Profiles and User Needs in Personalized Web Search", CIKM'08, Oct. 26-30, 2008, pp. 689-698.

Piwowarski et al., "Predictive User Click Models Based on Clickthrough History", CIKM'07, Nov. 6-8, 2007, 9 pages.

Gabrilovich et al., "Classifying Search Queries Using the Web as a Source of Knowledge", Yahoo! Research, PUC-Rio, UCLA, Rutgers University, vol. 3, Issue 2, Apr. 2009, 28 pages.

Radlinski et al., "Query Chains: Learning to Rank from Implicit Feedback", KDD'05, Aug. 21-24, 2005, 10 pages.

"Yahoo! Search—Get health tips, look up tricky words, and more", retrieved from < http://tools.search.yahoo.com/newsearch/resources>, Retrieved: May 8, 2012, 3 pages.

Teevan et al., "Information Re-Retrieval: Repeat Queries in Yahoo's Logs", SIGIR'07, Jul. 23-27, 2007, 8 pages.

Schraefel et al.,"Hunter Gatherer: Interaction Support for the Creation and Management of Within-Web-Page Collections" Dept. of Computer Science, Faculty of Information Systems University of Toronto, Canada, May 7-11, 2002, pp. 172-181.

Keller et al., "A bookmarking service for organizing and sharing URLs", Computer Networks and ISDN Systems 29, 1997, pp. 1103-1114.

Silverstein et al., "Analysis of a Very Large Web Search Engine Query Log", ACM SIGIR Forum, vol. 33 Issue 1, Fall 1999, ACM New York, NY, USA, pp. 6-12.

Catledge et al., "Characterizing Browsing Strategies in the World-Wide Web" School of Literature, Communication and Culture Graphics, Visualization, & Usability Center Georgia Institute of Technology Atlanta, GA 30332-0280, pp. 1-9.

Kellar et al., "A Field Study Characterizing Web-based Information Seeking Tasks" Journal of the American Society for Information Science and Technology, Jan. 15, 2005, 35 pages.

"Collect and Highlight, Then Remember", retrieved from <http://www.diigo.com>, Retrieved: May 8, 2012, 2 pages.

"Remember everything", retrieved from <http://evernote.com>, Retrieved: May 8, 2012, 1 page.

"Google Notebook", retrieved from <http://en.wikipedia.org/wiki/Google_Notebook>, Retrieved: May 8, 2012, 2 pages.

"Google Search Feature", retrieved from <http://www.google.com/help/features.html>, Retrieved: May 8, 2012, 5 pages.

"Google Sidewiki", Google Inc., retrieved from <http://en.wikipedia.org/wiki/Google_Sidewiki>, Retrieved: May 8, 2012, 3 pages.

"About Ask.com: MyStuff", retrieved from <http://about.ask.com/en/docs/mystuff/tour.shtml>, Retrieved: May 8, 2012, 1 page.

Donato, et al., "Do you want to take notes? Identifying research missions in Yahoo! Search Pad", WWW 2010, Apr. 26-30, 2010, Raleigh, North Carolina, USA, 10 pages.

Paolo, et al., "The Query-flow Graph: Model and Applications", CIKM'08, Oct. 26-30, 2008, Napa Valley, California, USA, pp. 609-617.

* cited by examiner

RESEARCH MISSION IDENTIFICATION

BACKGROUND OF THE INVENTION

1. Field of the Invention

The present invention generally relates to systems and methods for automatically ascertaining the information needs of a user of an information retrieval system, including but not limited to a user of a Web search engine.

2. Background

Addressing user's information needs has been one of the main goals of Web search engines since their early days. In some cases, users cannot see their needs immediately answered by search results, simply because these needs are too complex and involve multiple aspects that are not covered by a single Web or search results page. This typically happens when users investigate a certain topic in domains such as education, travel or health, which often require collecting facts and information from many pages. These types of activities may be referred to as "research missions." It has been observed that these "research missions" may account for as much as 10% of users' sessions and more than 25% of all query volume.

It would be advantageous if such "research missions" could automatically be identified as they are being conducted and with a high degree of accuracy. Since these "research missions" may account for a substantial percentage of all query volume, recognizing and answering user needs for such a large percentage of user queries would enhance a user's experience. Whereas conventional systems tend to examine individual queries, identification of "research missions" would lead the Web search engine to understand a user's intent behind otherwise unrelated queries. By automatically identifying "research missions," and thus understanding the user's intent, the Web search engine could actively provide specialized searches, research tools, directed ads, marketplace event(s), and/or other features to address the user's needs.

BRIEF SUMMARY OF THE INVENTION

A system and method in accordance with an embodiment of the present invention automatically detects when a user of a search engine is conducting a research mission directed to a particular topic. Based on such automatic detection, the user may then be provided with access to one or more features such as research-related tools or specialized searches, as well as be provided with directed ads and/or marketplace events related to the research mission. The automatic providing of these various tools, ads, and events responsive to detection of the research mission can advantageously improve the experience of the user conducting the research mission.

In particular, a method for automatically determining if a user of a search engine is conducting a research mission is described herein. In accordance with the method, a plurality of features related to a series of queries submitted by the user to the search engine are generated. Based on a first subset of the plurality of features, a detection is made as to whether the user is performing complex research using a first machine learned detector. Based on a second subset of the plurality of features, a detection is made as to whether the user is performing a mission related to a particular information need using a second machine learned detector. Responsive to at least the complex research detection and the mission detection, a determination is made as to whether the user is conducting a research mission.

A system is also described herein. The system includes a search engine and a research mission identification system. The search engine is configured to receive a series of queries submitted by a user, and is also configured to identify one or more documents responsive to each query in the series of queries. The research mission identification system includes a sessions unit, a features unit, a research detector, a mission detector, and a mixer. The sessions unit is configured to receive the series of queries and to generate a series of structured queries. The features unit is configured to generate a plurality of features based on analysis of the series of structured queries. The research detector is configured to detect if the user is performing complex research based on a first subset of the plurality of features using first machine learned rules. The mission detector is configured to determine if the user is performing a mission related to a particular information need based on a second subset of the plurality of features using second machine learned rules. The mixer is configured to determine if the user is conducting a research mission based on at least the complex research detection and the mission detection.

Another system is also described herein. The system includes a search engine and a research mission identification system. The search engine is configured to receive a series of queries submitted by a user, and is also configured to identify one or more documents responsive to each query in the series of queries. The research mission identification system includes a features unit, a detector unit, and a machine learned system. The features unit is configured to generate a plurality of features based on analysis of the series of queries. The detector unit is configured to detect if the user is performing complex research based on the plurality of features by measuring the user's level of engagement in a search. The detector unit is also configured to determine if the user is performing a mission related to a particular information need based on the plurality of features by measuring topical coherency between consecutive queries. The machine learned system is configured to determine if the user is conducting a research mission at least based on the complex research detection and the mission detection.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

A system and method in accordance with an embodiment of the present invention automatically detects when a user of a search engine is conducting a research mission about a particular topic. Based on such automatic detection, the user may then be provided with access to one or more features such as research-related tools and specialized searches, and/or be provided with directed ads and/or marketplace events related to the research mission, although these examples are not intended to be limiting. The automatic triggering of these various tools, ads, and events responsive to detection of the research mission can advantageously improve the experience of the user conducting the research mission.

Figure 1:
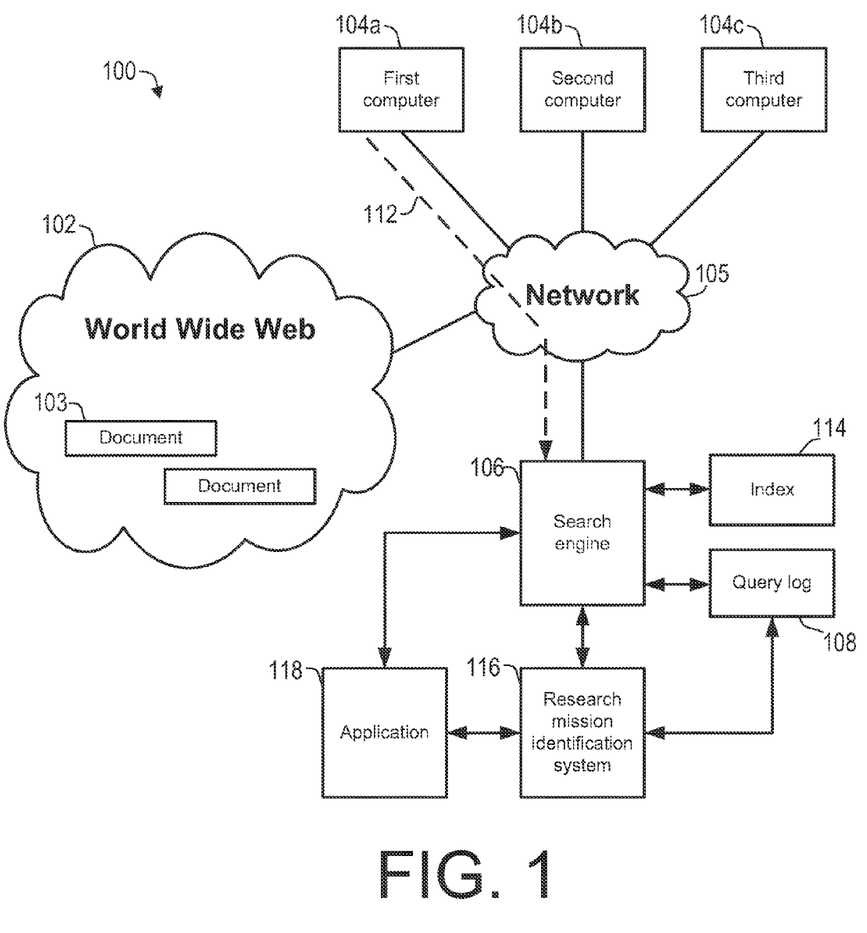
FIG. 1 is a block diagram of an information retrieval system in which an embodiment of the present invention may be implemented.

FIG. 1 is a block diagram of an information retrieval system 100 in which an embodiment of the present invention may be implemented. System 100 is described herein for illustrative purposes only, and it is noted that embodiments of the present invention may be implemented in alternative environments. As shown in FIG. 1, system 100 includes a search engine 106. One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to find documents relevant to query 112. For example, search engine 106 may identify a set of documents indexed by index 114 that include terms of query 112. The set of documents may include any number of documents, including tens, hundreds, thousands, millions, or even billions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents. The list of the returned documents may be provided in the context of a document termed a "search results page."

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

Figure 2:
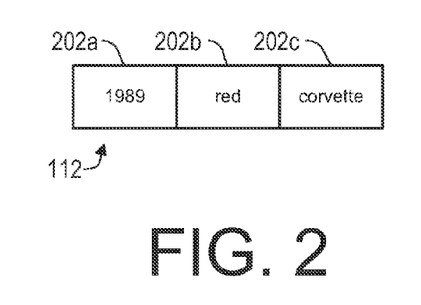
FIG. 2 shows an example query that may be submitted by a user to a search engine.

FIG. 2 shows an example query 112 that may be submitted by a user of one of computers 104a-104c of FIG. 1 to search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Search engine 106 applies these terms 202a-202c to index 114 to retrieve a document locator, such as a URL, for one or more indexed documents that match "1989," "red," and "corvette," and may order the list of documents according to a ranking.

As also shown in FIG. 1, search engine 106 may generate a query log 108. Query log 108 is a record of searches that are made using search engine 106. Query log 108 may include a list of queries, by listing query terms (e.g., terms 202 of query 112) along with further information/attributes for each query, such as a list of documents resulting from the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As further shown in FIG. 1, system 100 also includes a research mission identification system 116 connected to search engine 106 and query log 108. Research mission identification system 116 is configured to determine if a user of search engine 106 is conducting a research mission about a particular topic. If research mission identification system 116 determines that a user of search engine 106 is conducting a research mission about a particular topic, then research mission identification system 116 may automatically trigger the execution of an application 118. Depending upon the implementation, application 118 may comprise a research tool, such as Yahoo! Search Pad, a specialized search application, a direct ad delivery application, or a marketplace event, although these examples are not limiting. For example, the user can have a better searching experience by obtaining access to research tools for note taking and/or organization. Research mission identification system 116 may be able to provide specialized searches that reflect the intent of the users' research mission. Automatic providing of directed ads directed to the user's research mission, and/or marketplace events would help capitalize on the user's intent for the research mission.

By automatically asserting a triggering signal to trigger execution of application 118 responsive to automatic detection of a research mission, research mission identification system 116 can advantageously improve the experience of the user conducting the research mission. For example, in accordance with certain embodiments, such a feature ensures that access to specialized searches directed to the research mission and/or research-related tool(s) is provided at an appropriate time and within a convenient context for the user. This approach also represents an improvement over one in which the user must proactively recognize that a research mission about a particular topic is commencing and then, based on this recognition, take active steps to initiate any specialized searches and/or research tool(s). This latter approach requires extra planning and effort by the user. The approach implemented by research mission identification system 116 may also be deemed preferable to one in which the research tools, specialized searches, directed ads and/or marketplace events are provided to the user at all times, since this may actually condition the user to ignore them, particularly when such events and tool(s) are not useful in a majority of search sessions carried out by the user.

The manner in which research mission identification system 116 automatically determines whether a user is conducting a research mission using search engine 106 and the manner in which research mission identification system 116 asserts a triggering signal responsive to such a determination will be described in more detail below.

Like search engine 106, research mission identification system 116 may be implemented in hardware, software, firmware, or any combination thereof. For example, research mission identification system 116 may include software/firmware that executes in one or more processors of one or more computer systems, such as one or more servers.

B. Research Mission Identification

Figure 3:
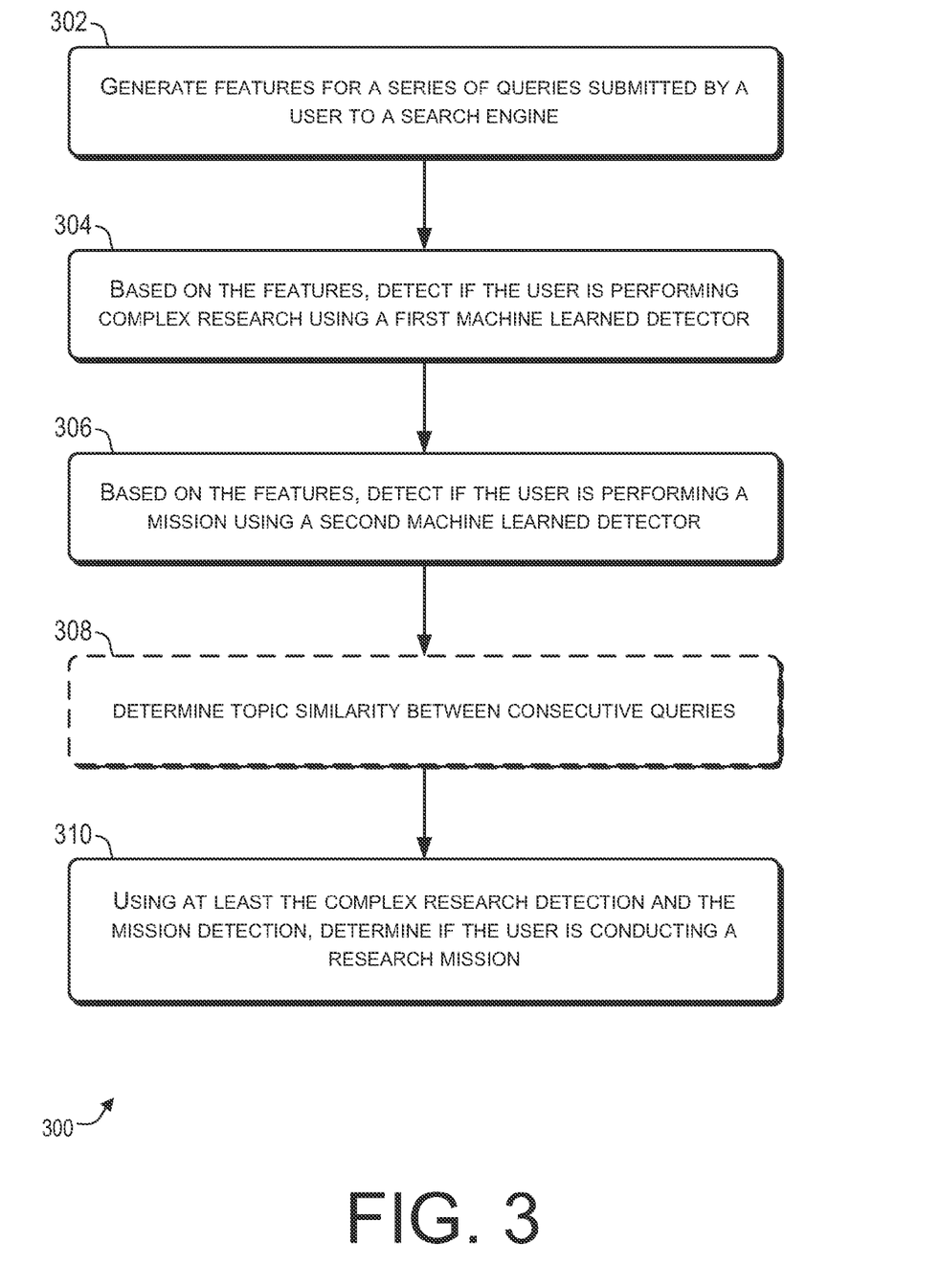
FIG. 3 depicts a flowchart of a method for automatically determining whether a user is conducting a research mission in accordance with an embodiment of the present invention.

FIG. 3 depicts a flowchart 300 of a method for automatically determining that a user of a search engine (such as search engine 106) is conducting a research mission about a particular topic in accordance with an embodiment of the present invention. The method of flowchart 300 will be described in reference to elements of system 100. However, it is noted that the method is not limited to that implementation. Also, the method of flowchart 300 may be modified by those skilled in the art in order to derive alternative embodiment(s). Also, the steps may occur in a different order than shown, some steps may be performed concurrently, some steps may be combined with other steps, and/or some steps may be absent, as desired.

As shown in FIG. 3, the method of flowchart 300 begins at step 302 in which research mission identification system 116 generates a plurality of features related to a series of queries submitted by a user to search engine 106. The user may be, for example, any of the users of computers 104a-104c and the queries may be submitted from any one of computers 104a-104c to search engine 106 via network 105 in a manner previously described. The features may be generated by feature functions that characterize queries on an individual and/or pair basis. Each feature may relate to a different aspect of the queries, such as a total number of queries in the series, a number of documents retrieved responsive to a query, the elapsed time in-between queries, among others. Example features will be described in more detail below. It is noted that the queries may be formatted (e.g., into structured queries) prior to research mission identification system 116 generating a plurality of features (e.g., by using feature functions) for the queries.

Depending upon the implementation, the feature functions may characterize a series of queries from query log 108 and/or directly from search engine 106. Additionally, all or part of the information related to the series of queries may be obtained from a browse history log (not shown in FIG. 1) which may be maintained by the same entity that maintains search engine 106. The browse history log maintains a list of documents previously accessed by a user, regardless of whether or not the user accessed the document via an interface, such as a search results page, provided by search engine 106. Depending on the implementation, the maintenance of browse history information for a particular user may or may not require that certain browser software be installed on the computer being used for accessing documents. Furthermore, all or part of the information related to the series of queries may be obtained from one or more network-level server logs that may be maintained by the same entity that maintains search engine 106. Still further, all or part of the information related to the series of queries may be stored locally on one of computers 104a-104c and then communicated via network 105 as part of an interaction between the computer and search engine 106.

Returning now to the description of FIG. 3, after the features are generated related to a series of queries submitted by the user at step 302, a portion of the features (a first subset of the features) are received by a first machine learned detector. The first machine learned detector uses the first subset of the plurality of features, generated for the series of queries, to detect if the user of search engine 106 is performing complex research, as shown at step 304. Specifically, the first machine learned detector performs the complex research detection by measuring the user's level of engagement in the search.

The first subset of features is used by the first machine learned detector to analyze two or more consecutive queries out of the series of queries for indications of user's personal involvement in the search, such as time elapsed in-between queries, consecutive user clicks on links for results of the same query, among others. The specific manner in which the first machine learned detector uses the first subset of features to detect if the user of search engine 106 is performing complex research will be described in more detail below. The output of this step is denoted "complex research detection," and it may be passed/propagated to the next step in one or more of various ways, depending on the implementation.

A second machine learned detector receives a second subset of the plurality of features generated for the series of queries, and then uses the second subset of the plurality of features to detect if the user of search engine 106 is performing a mission related to a particular information need, as shown at step 306. Specifically, the second machine learned detector performs the mission detection by measuring topical coherency between two or more consecutive queries out of the series of queries, such as by looking for indications of consecutive queries being directed to the same topic (and thus being part of the same mission).

The features in the second subset may include textual features, such as textual similarity between consecutive queries. The second subset of features may also use temporal (e.g., time-related) features. The specific manner in which the second machine learned detector uses the second subset of features to detect if the user of search engine 106 is performing a mission related to a particular information need will be described in more detail below. The output of this step is denoted "mission detection," and it may be passed/propagated to a subsequent step in one or more of various ways, depending on the implementation.

Optionally, a topic similarity detector may determine a first and a second topic of two or more consecutive queries, such as by using topic a taxonomy tree, as shown in optional step 308. The topic similarity detector may then detect if there is topic similarity between the first and the second of the two or more consecutive queries, such as by determining a distance between topic categories associated with each query in a hierarchically-organized taxonomy. Here, the topic detector may analyze consecutive queries directly and not necessarily receive any features. The manner in which the topic similarity detector determines the first and second topics and then detects any similarity between the two will be described in more detail below. The output of this step is denoted "topic similarity detection," and it may be passed/propagated to the next step in one or more of various ways, depending on the implementation.

At step 310, responsive to detection of whether the user is performing complex research and whether the user is performing a mission related to a particular information need (and optionally responsive to the topic similarity detection), research mission identification system 116 determines if the user is conducting a research mission. Research mission identification system 116 may receive detection information from the machine learned detectors for several consecutive query pairs prior to making its determination. For example, in one embodiment, research mission identification system 116 stores the detection information associated with multiple consecutive query pairs and makes a determination based on the detection information for the multiple consecutive query pairs. The specific manner in which research mission identification system 116 determines if the user is conducting a research mission will be described in more detail below. The output of this step is denoted "research mission trigger."

1. Research Mission Identification System

Figure 4:
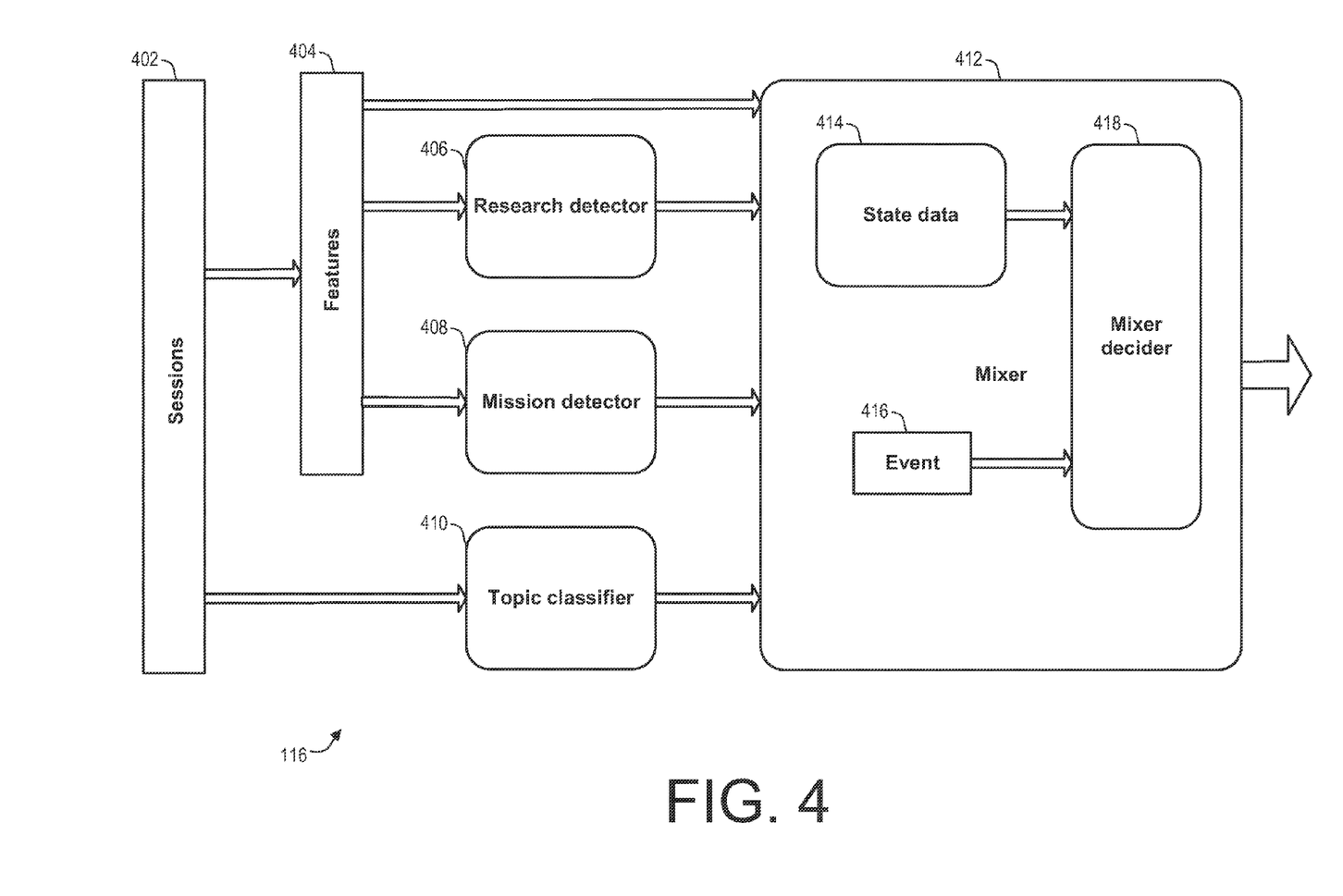
FIG. 4 is a block diagram that depicts a system for automatically determining whether a user is conducting a research mission in accordance with an embodiment of the present invention.

Research mission identification system 116 will be described in more detail below in reference to FIG. 4. Research mission identification system 116 may implement method 300 for automatically detecting that a user of a search engine, such as search engine 106, is conducting a research mission directed to a particular topic. It is noted that the block diagram of FIG. 4 is exemplary only. Further, various blocks/units of FIG. 4 may be present in a different order than that shown, or may not be present, as desired. Also, various additional blocks/units may be included as desired.

For example, if research mission identification system 116 performing method 300 is implemented in hardware, then a physical and/or logical signal may be propagated between various blocks/units implementing the method. For example, research mission identification system 116 may be implemented using programmable logic, such as an FPGA, or using a custom hardware chip, such as an ASIC, among others. If method 300 is implemented in software, then a software object, value, data, data address, pointer, and/or a function call may be used. Research mission identification system 116 may also be implemented in both software and hardware. For example, a portion of method 300 may be implemented in hardware, while another portion may be implemented using software-based components, such as software-based machine-learning components.

A sessions unit 402 may receive a series of queries submitted by a user to search engine 106, as well as any search results for the series of queries and/or any documents/web pages linked to by the search results, and generate a series of structured queries. As described above, the users may be, for example, any of the users of computers 104a-104c of FIG. 1. For example, a user may be using search engine 106 during one or more research sessions. A research session may be performed for various reasons and thus may contain a series of queries that search for various related and unrelated topics. Sessions unit 402 may receive the series of queries/search results/documents/web pages from search engine 106 and/or query log 108. Sessions unit 402 may then generate a series of structured queries from the series of queries. A structured query may simply provide a uniform format to the queries. One such uniform format is a <q, u, t, C> format, where q is the query, u is the user, t is the time the query was submitted, and C is the click information for sessions, which may be stored in query log 108. It is noted that in this document, the term "series of queries" may refer to either the series of queries or the series of structured queries.

A features unit 404 may receive and analyze the series of queries (e.g., a series of structured queries) from sessions unit 402, as well as any search results for the series of queries and/or any documents linked to by the search results, as described above with reference to method step 302. Specifically, features unit 404 may analyze the series of queries/search results/documents by applying one or more feature functions ("feature functions") that analyze the series of queries, such as on a query-pair basis. In other words, features unit 404 may output a plurality of features for a pair of queries at a time. Features unit 404 may also output a plurality of features that characterize search results and/or documents.

In the following example, the one or more feature functions are applied to queries, but the same principles apply when analyzing search results/documents. Various feature functions may be used by features unit 404 in research mission identification system 116. One or more of these features, as generated by their respective feature functions, may be considered by one or more of a research detector 406 and/or a mission detector 408. In one embodiment, each of detectors 406 and 408 may use a different subset of the features to perform a detection function for each query pair. It is noted that the following features are described by way of example only and are not intended to limit the present invention.

The feature functions of feature unit 404 may be applied to two or more consecutive queries of the series of queries. For example, in a series of queries 500 of FIG. 5, the feature functions may be applied to first query q1 502 and to second query q2 504. The feature functions may include functions directed to textual features, session features, and time-related features, among others. Feature functions directed to textual features can compute textual similarity between two or more consecutive queries. Feature functions directed to session features can compute session properties for the two or more consecutive queries. Feature functions directed to time-related features can compute time properties for the two or more consecutive queries.

Next, first and second machine learned detectors 406 and 408 may receive the output (i.e., the plurality of features) from features unit 404 related to the series of queries/search results/documents. In one embodiment, first machine learned detector 406 may be a research detector, and second machine learned detector 408 may be a mission detector. Based on the received plurality of features, first and second machine learned detectors 406 and 408 each may perform a respective determination regarding the series of queries/search results/documents.

Figure 5:
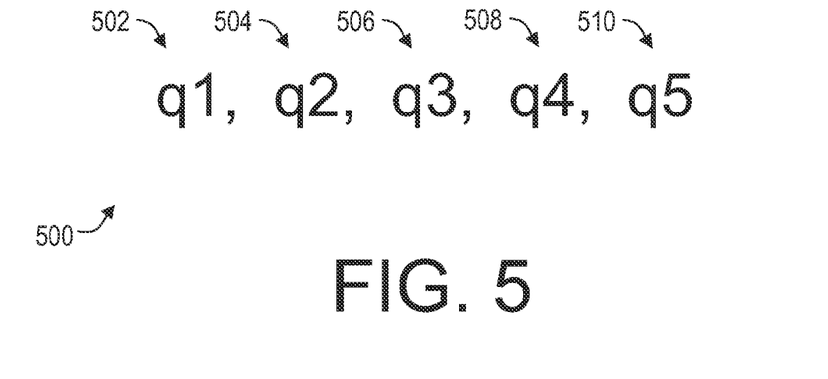
FIG. 5 depicts an exemplary series of queries posted by a user to a search engine in accordance with an embodiment of the present invention.

Continuing with the example above, research detector 406 and mission detector 408 may receive a plurality of features characterizing two queries q1 502 and q2 504. Each of research detector 406 and mission detector 408 may receive and/or use a different subset of the plurality of features—e.g., research detector 406 may receive and/or use a first subset of the plurality of features ("first feature subset") and mission detector 408 may receive and/or use a second subset of the plurality of features ("second feature subset"). Depending on the implementation, the first and the second feature subsets may contain different features, the same features, or the two feature subsets may contain overlapping features. The feature subsets may be chosen (e.g., by a system developer) based on their ability to characterize the queries in a manner needed by each respective detector 406 and 408.

Figure 6A:
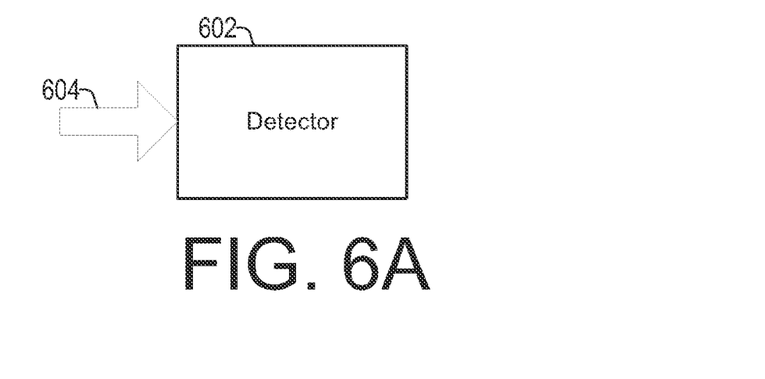
FIG. 6A is a diagram that depicts a detector implemented as a machine learning system in accordance with an embodiment of the present invention.

Both research detector 406 and mission detector 408 may use machine learned rules to process the first and second feature subsets to perform a respective determination based on their respective machine learned rules. Both research detector 406 and mission detector 408 may be trained before receiving the plurality of features. For example, as shown in FIG. 6A, both research detector 406 and mission detector 408 (each shown as a detector 602 for simplicity) may be trained by inputting a set of training data 604. In one embodiment, training data 604 includes a set of query pairs and, for each query pair, a set of features and an expected result. The expected result may be provided by a human editor (e.g., an annotator). For example, human editors may provide a label (i.e., the expected result) for each query pair, indicating whether the query pair represents research for research detector 406, or whether the query pair represents a mission for mission detector 408.

Detector 602 is configured to automatically process the training data to construct machine learned rules, such as by using any of the supervised learning methods known in the art. For example, detector 602 may create machine learned rules based on boosted decision trees. Thus, detector 602 may use its respective training data to derive a model or algorithm for determining, based on the features, whether a query pair represents research (for research detector 406) or a mission (for mission detector 408). In one embodiment, detector 602 may learn that a particular feature is particularly relevant for making this decision. In this case, that feature will figure more prominently in the algorithm. In contrast, if detector 602 learns that a particular feature is not relevant for making the decision, the feature may not figure prominently or at all in the algorithm. Once the machine learned rules are created for detector 602, the machine learned rules may be verified using any of the techniques known in the art.

Thus, training data 604 received by detector 602 may include a set of features (i.e., results of analysis by feature functions) that correspond to training pairs of consecutive queries, such as a series of queries 500 of FIG. 5. For example, five consecutive queries of the series of queries 500 include four pairs of queries: queries q1 502 and q2 504, queries q2 504 and q3 506, queries q3 506 and q4 508, and queries q4 508 and q5 510. The four query pairs for five consecutive queries q1-q5 502-510 are shown to illustrate concept of a moving window (e.g., of a pair of queries consisting of two consecutive queries) for series of queries 500 used in training, as well as analyzing and characterizing series of queries 500.

During machine training of detector 602, the queries may be input to features unit 404 to generate features therefor. An expected training result is also associated with each pair of consecutive queries. For example, the training results for research detector 406 may indicate whether training pairs of queries correspond to a user performing complex research (e.g., that the user is engaged in the research). Similarly, the training results for mission detector 408 may indicate whether training pairs of queries correspond to a user performing a mission related to a particular information need (e.g., that the respective pair of queries has topic coherence). The training results for each query pair may be generated manually, such as by human annotators, or automatically, such as by a training program.

Research Detector

Returning now to the description of FIG. 4, research detector 406 may test whether two consecutive queries are part of complex research by testing a user's level of engagement in the actual search being performed. For example, a user may be using a search engine, such as search engine 106, during one or more research sessions. A research session may be performed for various reasons and thus may contain search queries for various related and unrelated topics. Research detector 406 may examine the first subset of features for a pair of queries and apply machine learned rules to determine whether, based on user's engagement (as determined by applying the machine learned rules to the first subset of features), the pair of queries are part of complex research. The machine learned rules for research detector 406 are able to examine features such as session-based features that indicate a level of the user's level of engagement in the actual search. For example, the machine learned rules for research detector 406 may detect complex research if the received features indicate a large number of user clicks, a large number of queries since beginning of a search session, and/or of the length of the actual queries is long (e.g., a longer query may indicate a complex query). Research detector 406 mainly tests for the user's level of engagement, e.g., the effort exerted by the user, during the search process.

Thus, research detector 406 may receive the first feature subset for two or more queries and then use the machine learned rules to detect if the user is performing complex research for the two or more queries, as described above with reference to method step 304. For example, research detector 406 may receive the first feature subset for first and second queries q1 502 and q2 504 and use the machine learned rules to generate a research detection result specifying whether the user is performing complex research for first and second queries q1 502 and q2 504. In addition to generating the research detection result, research detector 406 may also generate an associated confidence level that indicates the statistical measure of confidence for the research detection result (e.g., a confidence level of 90 may indicate that out of a 100 test results, 90 can be expected to have the same anticipated result). Machine learned rules for research detector 406 may be referred to herein as first machine learned rules.

Mission Detector

Mission detector 408 may test whether two consecutive queries (i.e., a pair of queries) are part of a same mission by testing for topical coherency between consecutive queries in the search being performed. For example, a research session may be performed for various reasons and thus may contain search queries for various related and unrelated topics. Mission detector 408 may examine the first subset of features for a pair of queries and apply machine learned rules to determine whether, based on the topical coherency (as determined by applying the learned rules to the second subset of features), the pair of queries indicate that the user is performing a mission related to a particular information need. The machine learned rules for mission detector 408 are able to examine features such as textual-based features that indicate a textual similarity between the first and second queries in the pair of queries, as well as time-related features that can show how close the first and second queries are in time. For example, the machine learned rules for mission detector 408 may detect that the user is performing a mission related to a particular information need if there are textual similarities between queries q1 502 and q2 504. In one embodiment, mission detector 408 may also use time related features to see if two queries q1 502 and q2 504 were made close in time.

Thus, mission detector 408 may receive the second feature subset and then detect if the user is performing a mission related to a particular information need, as described above with reference to method step 306. For example, mission detector 408 may receive the second feature subset for first and second queries 502 and 504 and use the machine learned rules to generate a mission detection result specifying whether the user is performing a mission related to a particular information need for the first and second queries 502 and 504. In addition to generating the mission detection result, mission detector 408 may also generate an associated confidence level that indicates the statistical measure of confidence for the mission detection result. Machine learned rules for mission detector 408 may be referred to herein as second machine learned rules.

Topic Classifier

As described above with reference to optional method step 308, a topic classifier 410 may also receive the series of queries/search results/documents from sessions unit 402 and determine first and second topics for first and second consecutive queries in series of queries 500 (e.g., first query 502 and second query 504 respectively). Topic classifier 410 may then determine if there is similarity between the first and second topics, thereby determining if there is topic similarity between first query 502 and second query 504.

Topic classifier 410 may characterize first query 502 and second query 504 using a hierarchical tree based on a hierarchically-organized taxonomy of topic categories. One example of such hierarchically-organized taxonomy includes 1026 topic categories organized in a hierarchical tree with a depth of seven, but other hierarchical systems with a different number of topic categories and/or depths may be used instead. Other hierarchically-organized taxonomy techniques may be used in addition to, or instead of, the one described herein. In one embodiment, the topic classification system used by topic classifier 410 may be one that is already used by search engine 106.

Next, topic classifier 410 may use a topic determination function to determine a topic category (i.e., a node of the hierarchy tree) for each of first query 502 and second query 504. Topic classifier 410 may determine a distance between the respective nodes of the hierarchy tree for first query 502 and second query 504. For example, if the distance on the hierarchy tree between a node for the topic category associated with first query 502 and a node for the topic category associated with second query 504 is within a pre-determined value (e.g., a distance of two), then topic classifier 410 may output a result indicating that the topic similarity was detected between first query 502 and second query 504. Topic classifier 410 may also output a confidence level associated with the topic similarity result.

For example, in one embodiment, first query 502 of "Rome" and second query 504 of "Paris" may both map into separate nodes of the hierarchy tree, sharing the same immediate parent node of "Europe." Since both the node associated with first query 502 and the node associated with second query 504 share the same parent node of "Europe," the distance between the node associated with first query 502 and the node associated with second query 504 is two. Since the distance of two may be within the pre-determined value, topic classifier 410 may indicate that the topic similarity was detected between first query 502 and second query 504. However, other topic classification and topic similarity detection methods are possible.

Mixer

Next, a mixer 412 may receive results from each of research detector 406, mission detector 408, and (optionally) topic classifier 410 for series of queries 500. Mixer 412 may also receive features from features unit 404, as well as confidence levels associated with results from each detector 406 and 408 (as well as optionally from topic classifier 410). Mixer 412 may determine 310, using another set of machine-learned rules, if the user is conducting a research mission based on at least the complex research detection and the mission detection, and optionally also based on the topic classifier detection. In one embodiment, mixer 412 may make the determination 310 using two consecutive pairs of queries. In other embodiments, mixer 412 may use three, four, or more consecutive pair of queries when making the determination 310. Alternatively, mixer 412 may use non-consecutive pairs of queries when making the determination 310.

With regard to FIG. 5, mixer 412 may use the results from research detector 406 and mission detector 408, as well as optionally from topic classifier 410, for first pair of queries q1 502 and q2 504, and then for second pair of queries q2 504 and q3 506. Mixer 412 could also examine one or more features directly for these two query pairs as directly received from features unit 404. In order to make the determination 310 for multiple pairs of queries, mixer 412 uses state data 414 to store results of previous complex research detections, mission detections, and/or topic classifiers, as well previous determinations 310 whether the user was conducting a research mission. In other words, mixer 412 uses the stored detection results for previous query pairs in making a current determination 310 regarding user's research mission.

In one embodiment, since the result of mixer 412 may be used to trigger application 118 (such as research tool(s), specialized search(es), directed ad(s), and/or marketplace event(s)), mixer 412 may also keep track, in event data 416, of whether application 118 is currently provided. If application 118 is already provided, then mixer 412 may not generate another trigger signal even if it determines that the user is conducting a research mission. Alternatively, mixer 412 may generate a trigger signal if it determines that the user is conducting a research mission regardless of the current event state (regardless of whether event data 416 indicates that application 118 was provided), and thus any block/logic/unit receiving the trigger signal would need to determine how to react to the triggering signal.

In one embodiment, mixer 412 may include a mixer decider unit 418 that makes the determination 310 whether the user is conducting a research mission. Mixer decider unit 418 may use stored results (e.g., using state data 414) from research detector 406 and mission detector 408, as well as optionally from topic classifier 410, for first pair of queries q1 502 and q2 504 as well as for second pair of queries q2 504 and q3 506. Mixer decider unit 418 could also examine one or more features for these two query pairs directly received from the features unit 404, as well as any other state data 414 and/or event data 416.

Figure 6B:
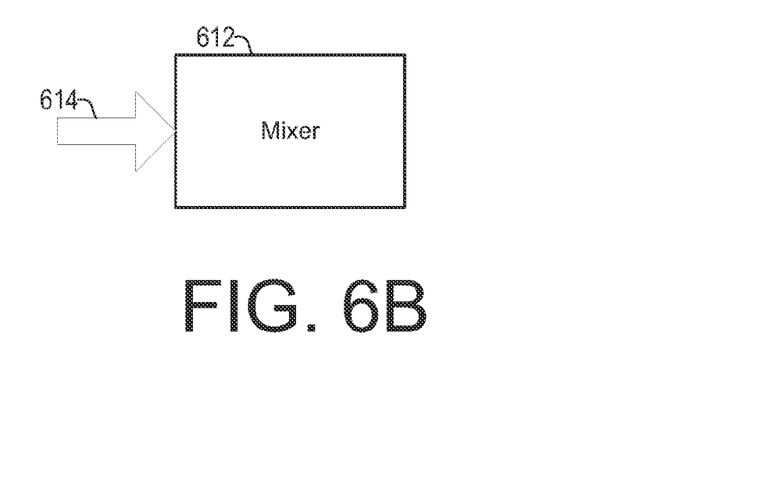
FIG. 6B is a diagram that depicts a mixer implemented as a machine learning system in accordance with an embodiment of the present invention.

Mixer 412 (and/or mixer decider unit 418) may be implemented as another machine learned system. In this case, mixer 412 may learn rules using logistic regression, but other techniques of machine learning may be used instead. For example, mixer 412 may be trained as shown in FIG. 6B, in a manner similar to that described with reference to FIG. 6A. During training of mixer 612, training data 614 simulating results from the detectors 406 and 408 (and optionally from topic classifier 410) and features unit 404 for a number of query pairs may be input to mixer 612. Training data 614 also includes an expected training result associated with each query pair. Training data 614 may include data for several consecutive pairs of queries. Once mixer 612 learns machine rules, they may be verified, as needed.

Thus, once the rules for mixer 412 (and/or mixer decider unit 418) are learned (and optionally verified), mixer 412 may internally generate a probability p that indicates a probability of whether the user is conducting a research mission. The probability p may thus be a result of the learned rules being applied to the results from the detectors 406 and 408 (and optionally from topic classifier 410) for the two consecutive query pairs. In one embodiment, mixer 412 may next use the probability p for the two consecutive query pairs to generate a triggering signal based on a triggering threshold T, a boosting factor B, as well as some additional rules, among others. It is noted that there may be other thresholds and/or factors used instead of, or in addition to, the exemplary ones described herein. The additional rules may either boost or blacklist the current determination.

Specifically, if mixer 412 receives signal from topic classifier 410 that at least one of the first and second topic comprises a predetermined popular research topic, the importance for the two or more consecutive queries may be increased such as by reducing the threshold T. For example, if either of the first topic or the second is a predetermined popular research topic (e.g., if it is on a boost list), then the threshold T may be divided by the boosting factor B, which results in a lowering of the threshold T. Exemplary popular research topics include search topics directed to travel, health, and job searches, among others.

Alternatively, if mixer 412 receives a signal from topic classifier 410 that at least one of the first and second topic comprises a blacklisted research topic, the importance of the two or more consecutive queries may be at least significantly limited or the determination may be cancelled altogether. For example, the triggering threshold T may be increased by a predetermined factor (e.g., a blacklist factor). In one embodiment, mixer 412 may simply determine that the user is not conducting a research mission, regardless of the results from other detectors 406 and 408 (or from topic classifier 410). Exemplary blacklisted research topics may include adult-themed searches, illegal searches, and the like.

2. Features

The plurality of features may be generated by features unit 404 using a plurality of feature functions that are applied to analyze and characterize series of queries 500. For example, the feature functions may be applied to analyze series of queries 500 on a query pair basis (such as first query 502 and second query 504). Features unit 404 may generate a plurality of features for each query pair. Each detector 406 and 408 may use a different subset of the plurality of features as needed for their respective detections.

Textual Features

In one embodiment, feature functions directed to the textual features (textual feature functions) are applied to compute textual similarity between two or more consecutive queries. For example, textual features may be computed for a first query q1 502 and a second query q2 504. The textual features may include the length and/or number of query terms in each of the two consecutive queries q1 and q2, cosine similarity between the two consecutive queries q1 and q2, Jaccard coefficient for the two consecutive queries q1 and q2, size of an intersection of the characters for the two consecutive queries q1 and q2, and/or Levenshtein edit distance between the two consecutive queries q1 and q2, among others. A measure of textual similarity between the terms of the queries in the series of queries may also include any of a variety of techniques known in the art for measuring the textual similarity between different words or strings of words for two queries 502 and 504. For example, such techniques may involve identifying common terms or underlying concepts among the different words or strings of words.

Session Features

In one embodiment, feature functions directed to the session features (session feature functions) are applied to compute session properties for the two or more consecutive queries, such as first query 502 and second query 504. For example, the session features may include a number of user clicks and/or queries in a current search session and/or a number of user clicks and/or queries since the last user click, among others. Other session features may include the number of documents accessed during the information retrieval session. A document may be accessed, for example, when the user activates a link to the document on a search results page provided by search engine 106. The number of documents accessed may be analyzed alone, in relation to particular queries for which the documents were identified, or in relation to the total number of queries submitted by the user.

Time Features

In one embodiment, the feature functions directed to time-related features (time-related feature functions) are configured to compute time properties for the two or more consecutive queries, such as first query 502 and second query 504. For example, the time-related features include time elapsed between the user posting first query 502 and second query 504, a reciprocal of the time elapsed between the two queries, and a total session time for the session (i.e., the information retrieval session) containing two queries 502 and 504, among others.

Other Features

In one embodiment, the feature functions may also measure similarity between documents identified by search engine 106 in response to receiving each of the two consecutive queries 502 and 504. These document-related features can also be used to discern a research mission intent on the part of the user. Comparing documents may comprise comparing only a subset of the documents identified by search engine 106 in response to the two consecutive queries 502 and 504. For example, only a predefined number of documents identified as most relevant to each of the two consecutive queries 502 and 504 may be compared. Alternatively, only documents accessed by the user during the information retrieval session containing the two consecutive queries 502 and 504 may be used in the comparison.

For example, comparing documents may comprise comparing text within the documents or comparing other information representative of the content of the documents such as titles of the documents, URLs associated with the documents, abstracts or summaries of the documents generated by search engine 106, tags associated with the documents, or various metadata associated with the documents. When comparing text within a number of documents, only a selected portion of the text may be compared. For example, in one embodiment, only a certain number of the most frequently occurring terms within each document are compared. Where the information to be compared comprises text, any of a wide variety of techniques known in the art for measuring the similarity between different words or strings of words may be used to provide a similarity measure. As noted above, such techniques may involve identifying common terms or underlying concepts among the different words or strings of words. The common terms or underlying concepts identified in this manner may further be used to help identify and describe the topic of the research session if one is detected.

Persons skilled in the relevant art(s) will readily appreciate that other types of the above listed features may be considered instead, or in addition to, the ones described.

3. Tuning the Research Mission Identification System

In one embodiment, a system administrator may tune a triggering sensitivity of research mission identification system 116, such as by tuning mixer 412 and/or mixer decider unit 418. For example, the triggering threshold T of mixer 412 may be set to be higher or lower depending on real-world triggering data, e.g., whether an event is triggered too soon or not soon enough. The real-world triggering data may be gathered from usability studies, marketing studies, particular needs of the user(s), as well as geographical considerations. For example, the triggering threshold T may be modified to favor precision or recall. A higher precision indicates a higher probability of a user conducting a research mission, whereas a higher recall indicates a higher probability of triggering. Some geographical regions may favor precision, meaning that event(s) would not be triggered unless research mission identification system 116 has a high level of confidence that a research mission is occurring, or in other words, there would be a small probability of false positives. Conversely, other geographical areas may favor recall, meaning that event(s) would be triggered even if research mission identification system 116 had moderate confidence that a research mission was occurring, or in other words, there would be a higher probability of false positives.

Furthermore, in one embodiment, a system administrator may tune the relative influence of each of the detectors that are used by mixer 412 and/or mixer decider unit 418 in research mission identification system 116. For example, the relative weight of the topic classifier 410 may be increased or decreased based on the particular needs of the user(s) and/or other considerations. In one embodiment, mixer 412 may be re-trained in order to re-learn and/or modify its machine-learned rules in response to the system administrator tuning relative influence of each of the detectors used by mixer 412. In one embodiment, mixer 412 may be able to simply use different weights and/or coefficients for each detector in its machine-learned rules in response to the system administrator tuning relative influence of each of the detectors used by mixer 412 without mixer 412 having to be re-trained to learn new machine learned rules.

4. Alternative Research Mission Identification System

Figure 7:
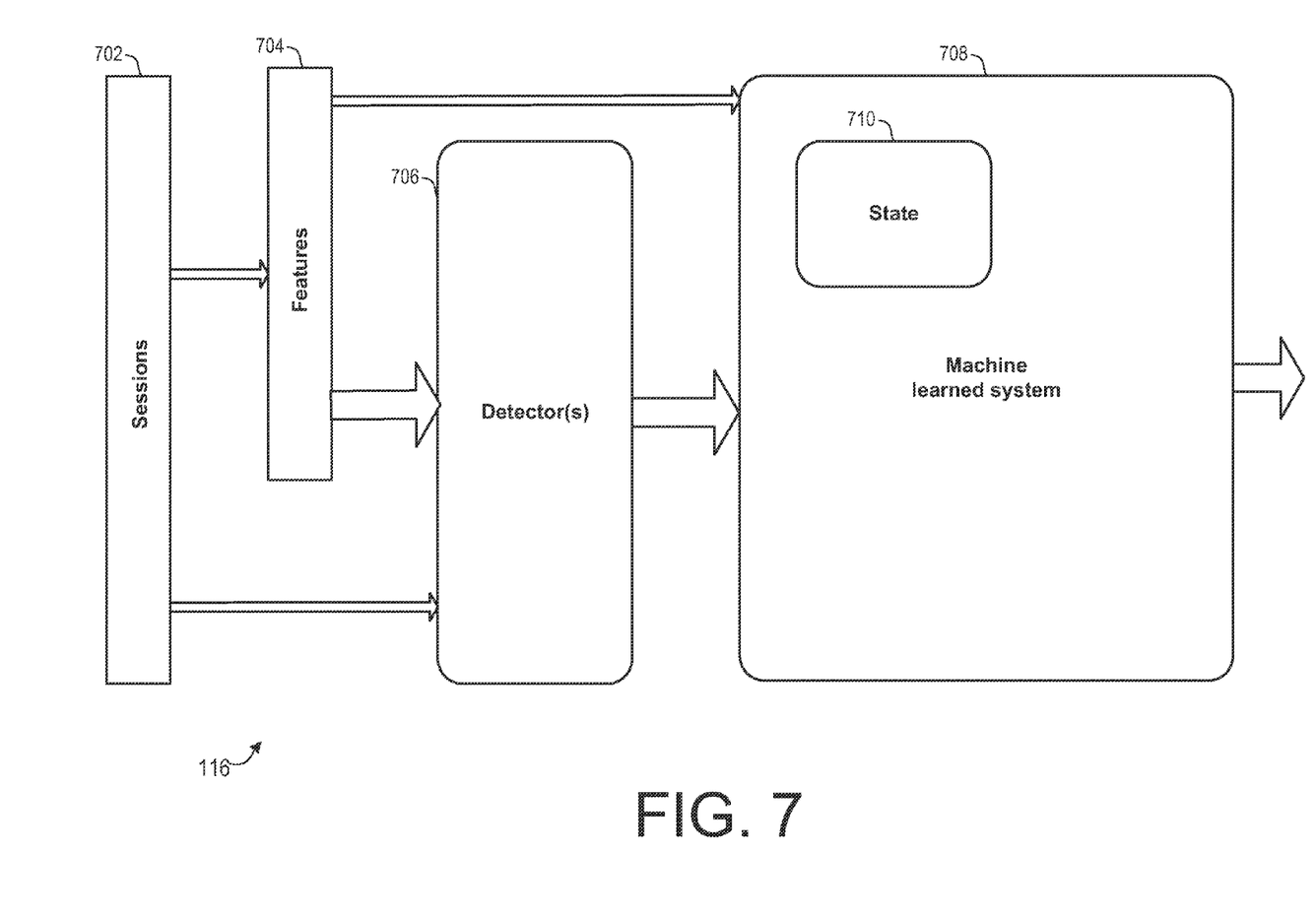
FIG. 7 is a block diagram that depicts an alternate system for automatically determining whether a user is conducting a research mission in accordance with an embodiment of the present invention.

As shown in FIG. 7, in one embodiment, research mission identification system 116 may include a sessions unit 702, a features unit 704, a detector(s) 706 and a machine learned system(s) 708. Sessions unit 702 may be substantially similar to sessions unit 402 of FIG. 4 and have similar functionality. Features unit 704 may also be substantially similar to features unit 404 of FIG. 4 and have similar functionality. Detector 706 may be configured to perform the functionality of research detector 406, mission detector 408, and optionally also of topic classifier 410. For example, detector 706 may be configured to receive the plurality of features from features unit 704 and apply machine learned rules (or a set of hard-coded rules) to create two or more separate results with associated confidence levels. Thus, detector 706 detects if the user is performing complex research, determines if the user is performing a mission related to a particular information need, and optionally detects if there is topic similarity between two or more consecutive queries in the series of queries based on the generated features.

Thus, detector 706 may have a single set of machine-learned rules that can perform the functionality of research detector 406, mission detector 408, and optionally also of topic classifier 410. Alternatively, detector 706 may have separate sets of machine-learned rules for the functionality of each of research detector 406, mission detector 408, and optionally also of topic classifier 410. In either case, detector 706 may propagate the results of applying the machine learned-rules to machine learned system 708. Alternatively, detector 706 may use hard-coded rules for the functionality of each of research detector 406, mission detector 408, and optionally also of topic classifier 410.

Machine learned system 708 may operate in a similar way to mixer 412 of FIG. 4 except that internal state data 414 and event data 416 may be both stored by a state unit 710. It is to be understood that research mission identification system 116 may be implemented as any combination of the embodiments described with reference to FIGS. 4 and 7, as desired.

5. Modular System

In one embodiment, research mission identification system 116 may be a modular system. The modularity enables various parts of research mission identification system 116 to be added, removed, and/or modified, without necessarily affecting the other parts of research mission identification system 116. In certain situations, the machine-learned rules of mixer 412 and/or one or more detectors 406 and 408 may need to be re-trained.

For example, the research mission identification system 116 may be able to use additional detector modules in additions to the ones described with reference to FIGS. 4 and 7. For example, a new detector unit may be configured to detect if a third subset of features for two consecutive queries indicates that the two consecutive queries relate to the same commercial product.

In another example, additional features may be added to features unit 404. These additional features may only be used by research detector 406 but not by mission detector 408. In this case, only the machine learned rules for research detector 406 may need to be re-learned (e.g., by re-training research detector 406 to learn new or changed first machine learned rules). The use of the additional feature by research detector 406 may make research detector 406 more accurate. However, the output of research detector 406 to mixer 412 is the same, so the machine learned rules in mixer 412 are not affected by these additional features.

Thus it can be seen that the modularity of the research mission identification system 116 gives the system architect much flexibility in designing and maintaining a custom research mission identification system 116.

6. Next Query Identification for Specialized Search Applications

In one embodiment, research mission identification system 116 may be used to improve search results for queries that are identified to be a part of the research mission. For example, if three consecutive queries in a series of queries were identified to be part of (i.e., used in order to identify) the research mission, then research mission identification system 116 may be able to guess the fourth query in the series of queries. The fourth query may be used by application 118, such as a specialized search application (and/or any component of search engine 106), to find and propose results to the user of search engine 106, before the user can actually issue the fourth query. In other words, research mission identification system 116 may be configured to guess and use the user's next query before it is issued. In one embodiment, mixer 412 may use machine learned rules to guess the next query in a series of queries, but other component(s) of research mission identification system 116 may be used instead.

However, the invention is not limited to such embodiments, and other means for determining if a user of a search engine is conducting a research mission may be used.

C. Example Computer System Implementations

Figure 8:
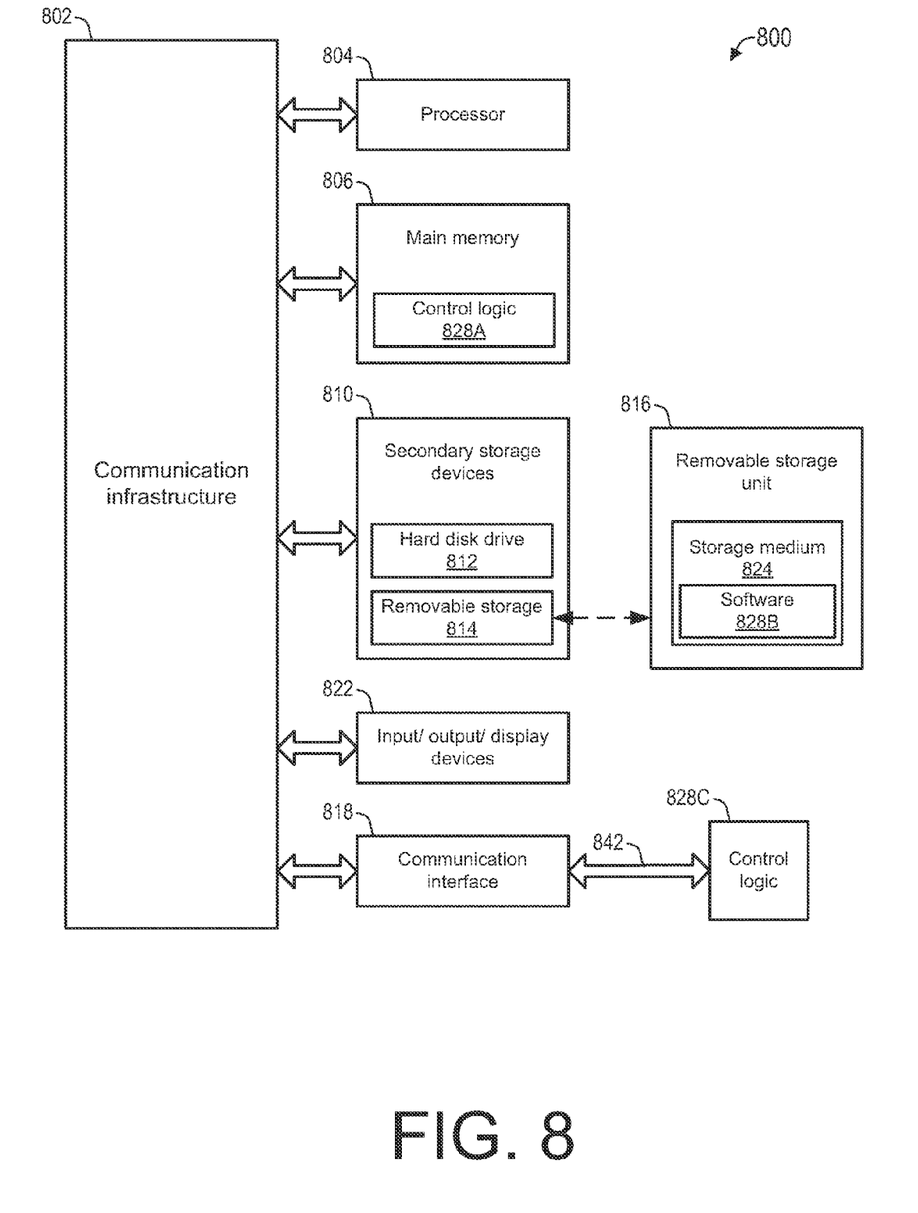
FIG. 8 is a block diagram of an example computer system in which embodiments of the present invention may be implemented.

The embodiments described herein, including systems, methods/processes, and/or apparatuses, may be implemented using well known servers/computers, such as computer 800 shown in FIG. 8. For example, search engine 106 and research mission identification system 116 of FIG. 1 the method described in the flowchart depicted in FIG. 3, and the research mission identification system 116 of FIGS. 4 and/or 7 can be implemented using one or more computers 800.

Computer 800 can be any commercially available and well known computer capable of performing the functions described herein, such as computers available from International Business Machines, Apple, Sun, HP, Dell, Cray, etc. Computer 800 may be any type of computer, including a desktop computer, a server, etc.

Computer 800 includes one or more processors (also called central processing units, or CPUs), such as a processor 804. Processor 804 is connected to a communication infrastructure 802, such as a communication bus. In some embodiments, processor 804 can simultaneously operate multiple computing threads.

Computer 800 also includes a primary or main memory 806, such as random access memory (RAM). Main memory 806 has stored therein control logic 828A (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 800 also includes input/output/display devices 822, such as monitors, keyboards, pointing devices, etc.

Computer 800 further includes a communication or network interface 818. Communication interface 818 enables computer 800 to communicate with remote systems and devices. For example, communication interface 818 allows computer 800 to communicate over communication networks or mediums 842, such as LANs, WANs, the Internet, etc. Network interface 818 may interface with remote sites or networks via wired or wireless connections.

Control logic 828C may be transmitted to and from computer 800 via the communication medium 842. More particularly, computer 800 may receive and transmit carrier waves (electromagnetic signals) modulated with control logic 828C via communication medium 842.

Any apparatus or manufacture comprising a computer useable or readable medium having control logic (software) stored therein is referred to herein as a computer program product or program storage device. This includes, but is not limited to, computer 800, main memory 806, secondary storage devices 810, and removable storage unit 816. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for determining if a user of a search engine is conducting a research mission, comprising:

generating a plurality of features related to a series of queries submitted by the user to the search engine;

based on a first subset of the plurality of features, detecting if the user is performing complex research using a first machine learned detector by measuring user's level of engagement in a search; and based on a second subset of the plurality of features, detecting if the user is performing a mission related to a particular information need using a second machine learned detector by measuring topical coherency between consecutive queries;

determining if the user is conducting a research mission based on at least the complex research detection and the mission detection.

2. The method of claim 1, further comprising:
determining a first topic of a first query in the series of queries;
determining a second topic of a second query in the series of queries; and
detecting if there is topic similarity between at least the first topic and the second topic;
wherein said determining if the user is conducting a research mission is further based on the topic similarity detection.

3. The method of claim 2,
wherein determining the first topic of the first query comprises assigning a first topic category from a hierarchically-organized taxonomy of topic categories to the first query;
wherein determining the second topic of the second query comprises assigning a second topic category from the hierarchically-organized taxonomy of topic categories to the second query; and
wherein said detecting if there is topic similarity between at least the first topic and the second topic comprises determining a distance between the first topic category and the second topic category in the hierarchically-organized taxonomy of topic categories.

4. The method of claim 1, wherein said determining if the user is conducting a research mission based on at least the complex research detection and the mission detection comprises:
calculating a probability that the user is conducting a research mission based on at least the complex research detection and the mission detection; and
determining if the probability exceeds a predefined threshold.

5. The method of claim 4, further comprising:
determining a topic of at least one of the queries in the series of queries; and
if the topic comprises a predetermined popular research topic, reducing the predefined threshold by a boosting factor associated with the predetermined popular research topic.

6. The method of claim 4, further comprising:
determining a topic of at least one of the queries in the series of queries; and
if the topic comprises a blacklisted research topic, determining that the user is not conducting a research mission.

7. The method of claim 1, wherein said detecting if the user is performing complex research using a first machine learned detector comprises:
the first machine learned detector receiving the first subset of the plurality of features for two or more consecutive queries of the series of queries; and
the first machine learned detector applying one or more machine learned rules to the first subset of the plurality of features to generate a complex research detection result and an associated confidence level, wherein the complex research detection result is indicative of user's level of engagement in a search;
wherein the first subset of the plurality of features include session features and time-related features.

8. The method of claim 7,
wherein the session features indicate various clickable events as related to a session where the two or more consecutive queries were made; and
wherein the time-related features indicate various time properties for the various clickable events and the session.

9. The method of claim 1, wherein said detecting if the user is performing a mission related to a particular information need using a second machine learned detector comprises:
the second machine learned detector receiving the second subset of the plurality of features for two or more consecutive queries of the series of queries; and
the second machine learned detector applying one or more machine learned rules to the second subset of the plurality of features to generate a mission detection result and an associated confidence level, wherein the mission detection result is indicative of topical coherence between the two or more consecutive queries;
wherein the second subset of the plurality of features include textual features, wherein the textual features indicate textual similarities between the two or more consecutive queries.

10. The method of claim 1,
wherein said determining if the user is conducting a research mission based on at least the complex research detection and the mission detection is performed for two consecutive pairs of queries, wherein a second query of a first pair of the two consecutive pairs and a first query of the second pair of the two consecutive pairs are the same query.

11. The method of claim 1, further comprising:
based on said determining, triggering one or more of:
one or more research tools;
one or more specialized searches;
one or more directed ads; and
one or more marketplace events.

12. The method of claim 1, further comprising:
keeping state data of one or more of:
previous determinations if the user is conducting a research mission;
the complex research detection;
the mission detection; and
at least a portion of the series of queries submitted by the user,
wherein said determining if the user is conducting a research mission is further based on the state data.

13. The method of claim 1, wherein one or more of the complex research detection and the mission detection have an associated confidence level;
wherein said determining if the user is conducting a research mission uses a respective associated confidence level for one or more of the complex research detection and the mission detection.

14. The method of claim 1, further comprising:
wherein said determining if the user is conducting a research mission based on at least the complex research detection and the mission detection comprises using a machine learned system;
the machine learned system applying one or more machine learned rules to the complex research detection and the mission detection to generate a research mission decision and an associated research mission decision confidence.

15. A system having at least one processor, storage, and a communication platform connected to a network for detecting a research mission, comprising:
a search engine configured to receive a series of queries submitted by a user and to identify one or more documents responsive to each query in the series of queries;
a research mission identification system comprising:
a sessions unit configured to receive the series of queries and to generate a series of structured queries;

a features unit configured to generate a plurality of features based on analysis of the series of structured queries therefrom;

a research detector configured to detect if the user is performing complex research based on a first subset of the plurality of features using first machine learned rules by measuring user's level of engagement in a search;

a mission detector configured to detect if the user is performing a mission related to a particular information need based on a second subset of the plurality of features using second machine learned rules by measuring topical coherency between consecutive queries; and a mixer configured to determine if the user is conducting a research mission based on at least the complex research detection and the mission detection.

16. The system of claim 15, wherein the research mission identification system further comprises:

a topic classifier configured to detect if there is topic similarity between two or more consecutive queries in the series of queries based on the series of structured queries;

wherein the mixer is configured to determine if the user is conducting a research mission based also on the topic similarity detection.

17. The system of claim 15, wherein the research detector is further configured to:

receive the first subset of the plurality of features for two or more consecutive queries of the series of queries; and apply one or more machine learned rules to the first subset of the plurality of features to generate a complex research detection result and an associated confidence level, wherein the complex research detection result is indicative of user's level of engagement in a search;

wherein the first subset of the plurality of features include session features and time-related features.

18. The system of claim 15, wherein the mission detector is further configured to:

receive the second subset of the plurality of features for two or more consecutive queries of the series of queries; and apply one or more machine learned rules to the second subset of the plurality of features to generate a mission detection result and an associated confidence level, wherein the mission detection result is indicative of topical coherence between the two or more consecutive queries;

wherein the second subset of the plurality of features includes textual features, wherein the textual features indicate textual similarities between the two or more consecutive queries.

19. A system having at least one processor, storage, and a communication platform connected to a network for detecting a research mission, comprising:

a search engine configured to receive a series of queries submitted by a user and to identify one or more documents responsive to each query in the series of queries;

a research mission identification system comprising:

a features unit configured to generate a plurality of features for the series of queries;

a detector configured to:

detect if the user is performing complex research based on the plurality of features by measuring user's level of engagement in a search; and determine if the user is performing a mission related to a particular information need based on the plurality of features by measuring topical coherency between consecutive queries; and a machine learned system configured to determine if the user is conducting a research mission based on at least the complex research detection and the mission detection.

20. The system of claim 19, wherein the detector is further configured to:

detect if there is topic similarity between two or more consecutive queries in the series of queries;

wherein the machine learned system is configured to said determine if the user is conducting a research mission based also on the topic similarity detection.

* * * * *